United States Patent [19]
Einkauf et al.

[11] Patent Number: 5,977,983
[45] Date of Patent: Nov. 2, 1999

[54] METHOD AND APPARATUS FOR ADJUSTING GRAPHICS PROCESSING PROCEDURES BASED ON A SELECTABLE SPEED/QUALITY GAUGE

[75] Inventors: Mark Alan Einkauf, Leander; Thomas A. Dye; Goran Devic, both of Austin, all of Tex.

[73] Assignee: S3 Incorporated, Santa Clara

[21] Appl. No.: 08/803,461

[22] Filed: Feb. 20, 1997

[51] Int. Cl.⁶ .................................................. G06T 11/00
[52] U.S. Cl. ........................................................ 345/430
[58] Field of Search ................................ 345/418, 419, 345/420, 424, 426, 429, 430

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,649,082 | 7/1997 | Burns | 345/430 |
| 5,706,478 | 1/1998 | Dye | 345/503 |
| 5,745,667 | 4/1998 | Kawase et al. | 345/430 |
| 5,758,128 | 5/1998 | Larson | 345/503 |
| 5,764,237 | 6/1998 | Kaneko | 345/430 |
| 5,778,250 | 7/1998 | Dye | 395/800.32 |
| 5,784,306 | 7/1998 | Ogletree | 364/750.5 |
| 5,793,386 | 8/1998 | Larson et al. | 345/522 |

FOREIGN PATENT DOCUMENTS

WO 96/36011  11/1996  WIPO .

*Primary Examiner*—Cliff N. Vo
*Attorney, Agent, or Firm*—Fenwick & West LLP

[57] ABSTRACT

A method and apparatus that adjusts certain graphics processing procedures based on a selectable speed/quality (S/Q) adjustment gauge. The S/Q adjustment can be tuned within a predetermined range (e.g., 0 to 255) where on one side, speed is represented over image quality while on the other side, image quality is represented over speed. Settings between the ends give proportional representation for speed and quality. A first graphics process determines whether linear or perspective texture mapping processes are to be used on the selected polygon based on: 1) the size of the polygon measured against a predetermined size threshold; and 2) the relative perspective of the polygon measured against a perspective threshold. The S/Q setting alters these thresholds to alter the operation of the first graphics procedure. A second graphics process splits a selected polygon graphics primitive based on the relative perspective of the polygon compared to a predetermined perspective threshold. The S/Q setting alters the predetermined perspective threshold to alter the operation of the second graphics procedure. A third graphics process splits the selected polygon based on: 1) the size of the polygon; and 2) the orthogonal span of the polygon. The S/Q setting alters the operation of the third graphics procedure. Lastly, a fourth graphics process selects either fixed point or floating point calculations for certain graphics operations on the primitive. The S/Q setting alters the thresholds for the selection within the fourth graphics procedure.

21 Claims, 10 Drawing Sheets

METHOD AND APPARATUS FOR ADJUSTING GRAPHICS PROCESSING PROCEDURES BASED ON A SELECTABLE SPEED/QUALITY GAUGE

FIELD OF THE INVENTION

The present invention relates to the field of graphics imaging and the display of images on a screen. More particularly, the present invention relates to a method for adjusting processing procedures that render graphics primitives in response to a selection from a speed/quality gauge setting.

BACKGROUND OF THE INVENTION

It is becoming more common for workstations and general purpose computer systems to be used for visual simulations. Such simulations are particularly useful in high end systems for industrial modeling applications and in lower end systems for entertainment (e.g., simulations, computer games, multi-media applications, etc.). Computer controlled graphics systems display graphics objects on a 2 dimensional (2-D) display; the graphics objects being composed of graphics primitive elements ("graphics primitives") that may include, for instance, points, lines, polygons, etc. represented using three dimensional (3-D) data structures (e.g., x, y, z). As is well known, the object displayed is represented internally by the graphics system with three dimensional (3-D) data structures (e.g., x, y, z) which are transformed into 2-D elements (e.g., x, y) which are then used to render a 2-D image of the 3-D object. The process of rendering images on the screen is complex and includes individually processing graphics primitives and performing texture mapping operations on them.

Texture mapping refers to techniques for adding surface detail to areas or surfaces of the 3-D graphics objects displayed on the 2-D display. Since the original graphics object is 3-D, texture mapping maintains certain perspective attributes with respect to the surface detail added to the object. Generally, texture mapping occurs by accessing encoded surface detail points or "texels" from a memory which stores the surface detail and then transferring the surface detail texels to predetermined points of the graphics primitive that is being texture mapped. More specifically, texture mapping operates by applying color or visual attributes of texels of the (u, v) texture map to corresponding pixels of the graphics object on a display screen. In texture mapping, color values for pixels in (x, y) display coordinate space are determined based on sampled texture map values from (u, v) coordinates. After texture mapping, a version of the texture image is visible on surfaces of the object. The manner in which the texels are accessed and used to provide the perspective is a complex process that can utilize interpolation which increases processing speed but provides only an "estimation" of the true perspective condition.

There are three types of texture mapping including linear, second order homogeneous perspective and second order non-homogeneous perspective. In linear texture mapping, texels of a texture map are generally mapped onto pixels of a 2-D graphics primitive linearly whereby the rate of sampling in texel space (u, v) with respect to the screen coordinate (x, y) update rate is constant, e.g., du/dx and du/dy are constant values. Linear texture mapping is not process intensive. In perspective texture mapping, texels of a texture map are generally mapped onto pixels of a 3-D graphics object that is displayed in 2-D space (x, y) wherein the rate of sampling in texel space with respect to the rate of screen coordinate update rate is not constant. Perspective texture mapping is process intensive and it features an illusion of depth which is created by varying the sampling rate of the texture map during the normal linearly performed polygon rendering process on the display screen.

In one system, a graphics subsystem (accelerator) performs the necessary processing to generate the simulation in real-time using interpolation driven processes to perform texture mapping. Typically, the graphics subsystem includes local memory for storing graphics data in a "display list" and a graphics engine that determines the texture (e.g., texture mapping) to be applied to picture elements (pixels) to form the simulation on the computer systems graphics display. Using techniques that are well understood by those skilled in the art, display images are first decomposed into graphics primitives comprising multiple polygons each of which may be readily rotated or otherwise transposed by the graphics subsystem before being sent to the frame buffer memory. As the perspective of the viewer changes, the displayed images must be redrawn to provide the proper visual perspective. Accordingly, graphics subsystems must be capable of mapping the texture onto the polygons in real-time as the position of the polygons are rotated, translated or otherwise shifted.

To maintain perspective, associated with each vertex of a graphics primitive, is a perspective value, W, that defines the spatial relation of the primitive with respect to its relative distance and position as it might appear to the eye of a viewer when rendered on the display. To perform perspective operations with high image quality, substantial computations are performed by the graphics subsystem. In low cost graphic engines, interpolation driven texture mapping and rendering processes are used to speed the rendering process and limit memory requirements. However, maintaining proper orientation of the texture map with respect to the polygon as the perspective changes and interpolating interior (u, v) texels requires extensive computing power to prevent distortion, artifacts, wavy appearances, aliasing or other rendering errors. For images displayed in a video game with, by way of example, a road disappearing into the distance at infinity, the perspective can vary from W=1 for objects near the front of the screen perceived as close to the viewer to W=6 or W=10 (or greater) for objects receding into the distance near the back of the screen. Massive perspective (e.g., W>5) in real-time computer simulations often cause hardware rendering engines perform a relatively large amount of computations (and time) to display the polygon without artifacts. This is especially true if the polygon is texture mapped.

However, in many applications real-time computer simulations do not require high image quality because the screen images rapidly change from frame to frame thereby hiding slight image degradation from the eye. In addition, some graphics elements, due to their small size, do not exhibit well their perspective nature, e.g., notwithstanding the fact that these small elements are displayed with perspective, they appear very linear to the eye. What is needed is a system that is operable between one mode whereby images are rendered in high quality, maintaining all accurate texture mapping, and perspective elements, and a second mode whereby images are rendered in high speed, but with some degradation in their texture mapping and perspective elements. What is further needed is a system also that increases processing efficiency with respect to small polygons whose perspective display closely resembles a linear display. The present invention provides such a system.

There are other factors affecting image quality and system performance. Such factors include mathematical accuracy in computing various color and geometry gradients (slopes), as well as error correction methods used to compensate for various hardware limitations. The greater degree of accuracy and error compensation used increases image quality, but at a cost of slower performance. Again, a system is needed in which a user can select various degrees of quality versus performance regarding these graphical computations and the present invention provides such a system.

SUMMARY OF THE INVENTION

A method and apparatus are described herein that adjust certain graphics processing procedures based on a selectable speed/quality (S/Q) adjustment gauge. The S/Q adjustment can be tuned within a predetermined range (e.g., 0 to 255) where on one side, speed is represented over image quality while on the other side, image quality is represented over speed. Settings between these ends give proportional representation for speed and quality as the case may be.

Within the present invention, a first graphics process determines whether linear or perspective texture mapping processes are to be used on the selected polygon based on: 1) the size of the polygon measured against a first predetermined size threshold; and 2) the relative perspective of the polygon measured against a first perspective threshold. The S/Q setting alters these thresholds to alter the operation of the first graphics procedure. As more quality is requested, the first size threshold and the first perspective threshold are decreased to perform more perspective texture mapping and as more performance is requested, the first size threshold and the first perspective threshold are increased to provide more linear texture mapping.

A second graphics process splits a selected polygon graphics primitive based on the relative perspective of the polygon compared to a second predetermined perspective threshold. The S/Q setting alters the second predetermined perspective threshold to alter the operation of the second graphics procedure. More requested quality decreases the second perspective threshold to split more polygons while more requested performance increases the second perspective threshold allowing larger polygons. A third graphics process splits the selected polygon based on: 1) the size of the polygon based on a second size threshold; and 2) the orthogonal span of the polygon based on an ortho size threshold. The S/Q setting alters the operation of the third graphics procedure. More requested quality decreases the second size and the ortho size thresholds to split more polygons while more requested performance increases the second size and ortho size thresholds allowing larger polygons. Lastly, a fourth graphics process selects either fixed point or floating point calculations for certain graphics operations (e.g., geometry, Z-buffer, alpha-blending, gouruad shading, and texture mapping) performed on the primitive. The S/Q setting alters the thresholds for the selection within the fourth graphics procedure.

The above four procedures contain individual heuristics that alter their operation based on the value of the S/Q setting such that speed of rendering or image quality is represented proportionally. The S/Q setting can be user originated or can originate from an automatic process that is based on user selections for a particular application. Within the present invention, it is assumed that the S/Q value is given (e.g., as a result of a library or other function call).

DESCRIPTION OF THE PREFERRED EMBODIMENTS

Figure 1:
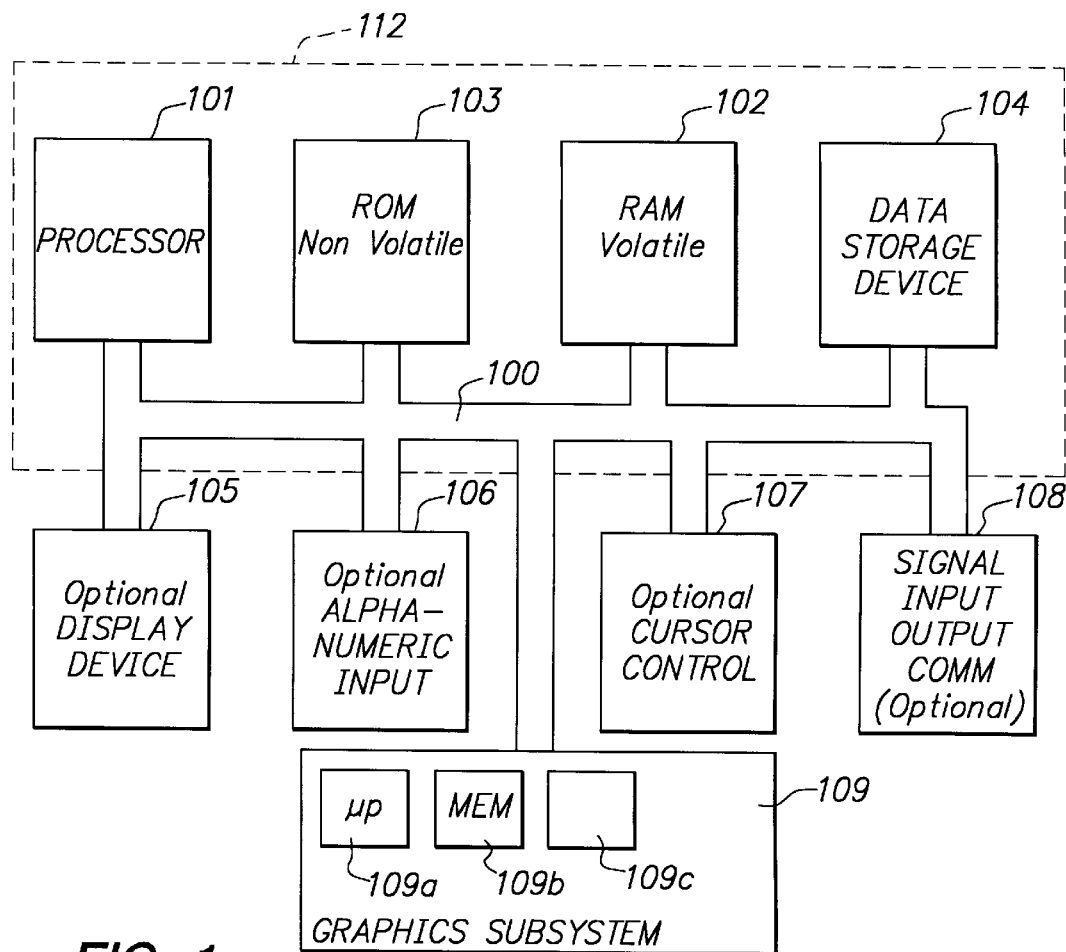
FIG. 1 illustrates a computer controlled graphics display system having a host processor and a graphics subsystem with the capability of rendering visual simulations on a display screen.

In the following description of the preferred embodiment, reference is made to the accompanying drawings which form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with a computer system equipped to display graphics in real-time. However, it is contemplated that the present invention can be used in conjunction with other digital display systems. Reference will now be made in detail to the preferred embodiments of the invention, examples of which are illustrated in the accompanying drawings. Wherever possible, the same reference numbers will be used throughout in the drawings to refer to the same or like components.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Computer System Platform

Refer to FIG. 1 which illustrates a computer controlled display system ("computer system") 112. Within the following discussions of the present invention, certain processes (e.g., processes 200, 400, 485, 610, 500, 700, and 800) are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. As will be appreciated by person of ordinary skill in the art, memory 104 may contain information, such as application programs, network communication programs, operating systems, data, graphics display data etc.

System 112 also includes a mass storage computer readable data storage device 104 (hard drive or floppy) such as a magnetic or optical disk and disk drive coupled with the bus 100 for storing information and instructions. Optionally, system 112 can include a display device 105 for displaying information to the computer user, an optional alphanumeric input device 106 including alphanumeric and function keys coupled to the bus 100 for communicating information and command selections to the central processor(s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is an x86 microprocessor based computer system, but could equally be of a number of other various well known and commercially available platforms (e.g., DEC Alpha, Power PC, RISC based, etc.).

The host processor 101 provides data and control signals via bus 100 to a graphics subsystem 109. The graphics subsystem 109 typically contains a display processor 109a which executes/processes a series of display instructions and graphics primitives found within a display list stored in local volatile memory 109b. The display processor 109a supplies data and control signals to a frame buffer (not shown) which refreshes the display device 105 for rendering images (including graphics images). Specialized and well known circuits 109c are also included in graphics subsystem 109 for implementing sound and graphics special effects and perform high speed graphics processing. Although not shown, the graphics subsystem 109 can be directly coupled to drive display device 105. Graphics subsystem 109 also typically is granted high priority access to memory 104 for processing image data prior to display.

To display a three-dimensional (3-D) object on display 105, the object is decomposed by system 112 into a plurality of graphics commands and graphic primitives including, for example, polygons (e.g., triangles), lines and points to obtain a representation of the object. In one embodiment, polygons are triangles having three vertices, but could also include geometric representations having more than three vertices (e.g., rectangles, etc.). As used herein, the term polygon and triangles are used interchangeably unless specifically otherwise noted. The vertices of the triangles are described by respective three dimensional Cartesian coordinates (x, y, z). The vertices are stored in either memory 104 or in the local memory 109b of graphics subsystem 112 and define the object's shape and position.

System 112 applies texture maps to the displayed surfaces of the graphics triangles to provide surface shading, volume rendering or to otherwise present a realistic appearance of the object. A texture is image data ("texels") that are mapped or matched to the pixels of the polygons of the graphics primitives so that the displayed object has the appearance of realism. Graphic subsystem 109 maps texture by matching texture coordinates (u, v) with a corresponding vertex of the polygon and then rendering the image on the display screen. In one embodiment, texture inside the polygon is determined by interpolation within subsystem 109; one process of which is described in more detail in copending patent application entitled Non-Homogenous Second Order Perspective Texture Mapping Using Linear Interpolation Parameters, by Gautam P. Vaswani et al., filed on Dec. 30, 1996, Ser. No. 08/774,787, now U.S. Pat. No 5,835,097 and assigned to the assignee of the present invention. In general, the basic steps of the texture mapping process are to: assign texture coordinates to the vertices of each polygon to define a mapping function from texture coordinate space to the display coordinates in display space; interpolate to determine corresponding texture coordinates for each pixel coordinate within the polygon based on the texture coordinates assigned to the polygon's vertices and based on certain parameters computed for the polygon; and assign textual values to each pixel inside the polygon during the rendering process based on the determined texel coordinates.

Exemplary Primitive

Figure 2:
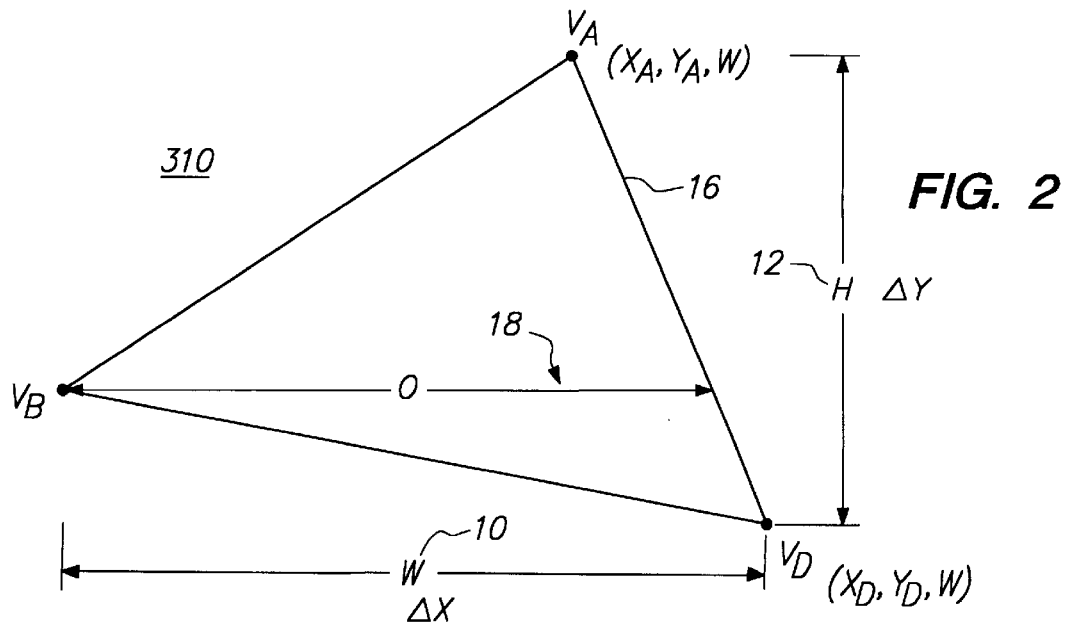
FIG. 2 is an illustrative representation of a selected graphics primitive (e.g., a polygon) in accordance with the present invention.

FIG. 2 illustrates an exemplary selected graphics primitive (e.g., a polygon) 310 which is manipulated within the first, second third and fourth processes of the present invention as described below. The polygon 310 has three vertices referenced by Va ("A"), Vb ("B") and Vd ("D"). Certain measurements with respect to polygon 310 are now discussed. Associated with each vertex is also a two dimensional screen position coordinate: (xA, yA), (xB, yB), and (xD, yD), respectively, and also a perspective term: WA, WB, and WD, respectively. The maximum height H 12 of the polygon 310 is measured based on the maximum vertical distance (e.g., maximum Δy) between the three vertices Va, Vb and Vd. The maximum width W 10 of the polygon 310 is measured based on the maximum horizontal distance (e.g., maximum Δx) between the three vertices Va, Vb and Vd. The ortho span O 18 is measured as the maximum horizontal distance from the main slope 16 to the vertex that is not part of the main slope (e.g., vertex Vb).

I. Selection Between Linear or Perspective Texture Mapping

Figure 3:
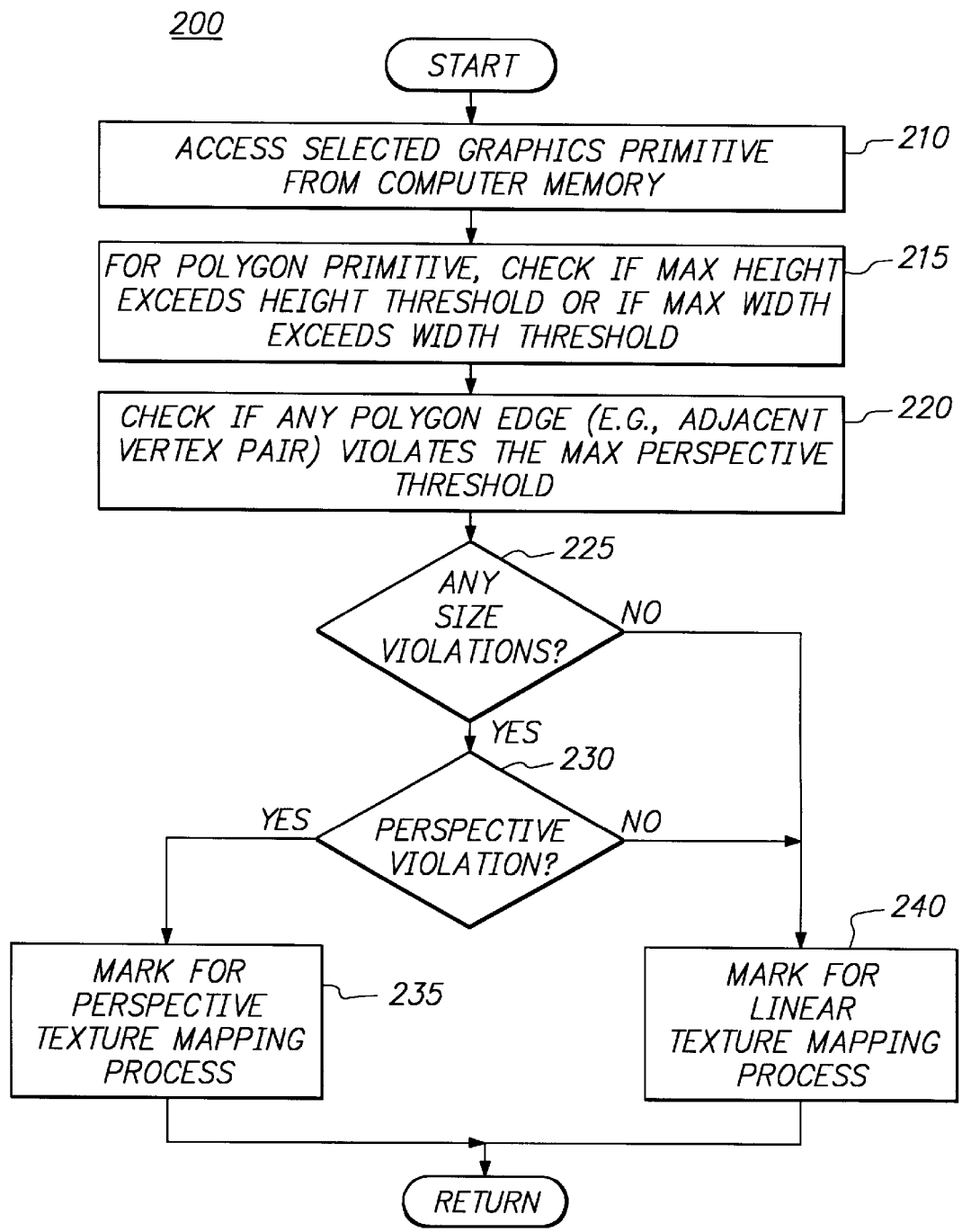
FIG. 3 is a flow diagram of steps of a process which selects either perspective or linear texture mapping for a selected graphics primitive in accordance with a first process of the present invention.

FIG. 3 illustrates a first process (process 200) of the present invention; process 200 is implemented as program code stored in computer readable memory units of system 112 and is executed over host processor 101 and/or by subsystem processor 109a, and/or by a dedicated hardcoded processor. Process 200 is responsible for determining when a selected polygon 310 meets such criterion that when displayed it will in any event appear linear to the eye. In this case, the present invention process 200 selects a linear texture mapping process for the selected polygon 310, even though perspective texture mapping would otherwise be in order. Process 200 thereby avoids the additional time and processing resources expended by perspective rendering. In these cases, the first process 200 efficiently increases graphics rendering speed without noticeable degradation in image quality.

At step 210 of FIG. 3, a selected graphics primitive 310 is accessed from a display list stored in local memory 109b (or from memory 102). At step 215, process 200 checks if the maximum height of selected polygon 310 (e.g., H 12 of FIG. 2) exceeds a first predetermined height threshold value or if the maximum width of selected polygon 310 (e.g., W 10 of FIG. 2) exceeds a first predetermined width threshold value. The first height and the first width threshold values are predetermined values in accordance with the first process of the present invention and together represent a first size threshold. These threshold values are predetermined based on the particular graphics system 112 employed and are adjusted by the setting of a speed/quality gauge (S/Q value) which is a user originated term (described further below). In one embodiment, the maximum height and width threshold are each 5 pixels but can be adjusted based on the S/Q value such that when the S/Q value increases, these threshold values decrease (e.g., to improve quality over performance) and when the S/Q value decreases, these threshold values increase (e.g., to improve performance over quality). A number of specific heuristics can be applied to the above general relationship within the spirit of the present invention.

The general technique behind step 215 is that certain polygons due to their small size will appear linearly on display screen 105 whether or not they are texture mapped using perspective or linear texture mapping procedures. Therefore, the present invention avoids the time consuming process of rendering a "small" area triangle using perspective techniques when linear techniques provide a sufficient rendition while consuming less processing resources and time.

At step 220 of FIG. 3, process 200 checks if any of the edges of polygon 310 exceed a first maximum perspective ratio, which can as well be adjusted by the S/Q value. The general technique behind step 220 is that certain polygons due to their small perspective amounts will appear linearly on display screen 105 whether or not they are texture mapped perspectively or linearly. Therefore, the present invention avoids the time consuming process of rendering triangle having small perspective amount using perspective techniques when linear techniques provide a sufficient rendition while consuming less processing resources and time. As described below, there are two different methods to check for perspective violations at step 220.

At step 220, the amount of perspective for selected polygon 310 can be determined in the manner described with respect to step 430 (FIG. 4A) where perspective ratios of each of the three edges are computed (based on the respective W terms of the edge's vertices) and tested to determine whether or not any ratios violate the first perspective threshold. Alternatively, the below procedure can be used to determine a perspective violation at step 220:

max_w_ratio=1.03* selected_visual_quality
w1_times_max=vertex1.w*max_w_ratio
w2_times_max=vertex2.w*max_w_ratio
w3_times_max=vertex3.w*max_w_ratio
if ( (vertex1.w<w2_times_max) AND (vertex1.w<w3_times_max) AND
(vertex2.w<w1_times_max) AND (vertex2.w<w3_times_max) AND
(vertex3.w<w1_times_max) AND (vertex3.w<w2_times_max))
then no perspective violation
else perspective violation where vertex1.w is WA (FIG. 2), vertex2.w is WB, vertex3.w is WD, and selected_visual_quality is based on the S/Q value such that it decreases when the S/Q value increases (promotes quality over performance) and selected_visual_quality increases when the S/Q value decreases (promotes performance over quality).

At step 225 of FIG. 3, process 200 checks if either the maximum width (W 10) or the maximum height (H 12) of the selected polygon 310 violated its respective threshold, as determined in step 210. If so, then step 230 is entered. If not, then the selected polygon 310 is sufficiently small in area to avoid perspective texture mapping and the selected polygon 310 is therefore marked for "linear" texture mapping by step 240. At step 230, process 200 checks if any perspective ratios were violated for the selected polygon 310 as determined in step 220. If so, step 235 is entered where perspective texture mapping is flagged for this polygon 310. If not, the selected polygon 310 contains low perspective and can be texture mapped using a linear texture mapping process. Essentially, if all vertices have similar W terms, even though the area comprised by those vertices may be large, perspective effects are still minimal and linear texture mapping is sufficient. The selected polygon 310 is therefore marked for "linear" texture mapping at step 240. At step 235, the selected polygon 310 is either too big in area or has too much perspective (or both) and therefore is marked for "perspective" texture mapping. Process 200 then returns.

It is appreciated that process 200 is typically followed by a polygon rendering step that performs texture mapping (e.g., based on the selected linear/perspective texture mapping method) and displays a physical visual representation of the polygon on display screen 105 (FIG. 1). It is further appreciated that by adjusting the S/Q value, the present invention adjusts the determinations performed at steps 215 and 220 as to whether or not a size (area) or perspective violation exists. In this manner, the present invention is able to tune the operation of process 200 between more quality or more performance. As quality is requested over performance, the size and perspective thresholds are decreased so that more polygons are forced into perspective texture mapping. As performance is requested over image quality, the size and perspective thresholds are increased so that more polygons are allowed to be linearly texture mapped.

II. Polygon Split Based on Perspective Ratio

The second process of the present invention determines if the amount of perspective in a selected polygon 310 creates visible artifacts or distortion during the rendering process, and if so, the polygon 310 is divided, and subdivided if need be, until all resultant triangles satisfy a second perspective threshold (e.g., it is determined that visible artifacts are eliminated). The second perspective threshold is used to determine a perspective violation and this value can be adjusted based on the S/Q value referenced above. The second process of the present invention is particularly useful when applied in conjunction with an interpolation driven texture mapping process as described in copending patent application entitled Non-Homogenous Second Order Perspective Texture Mapping Using Linear Interpolation Parameters, by Gautam P. Vaswani et al., file on Dec. 30, 1996, Ser. No. 08/774,787, now U.S. Pat. No. 5,835,097 and assigned to the assignee of the present invention. The operation of the second process of the present invention is first described generally, and then described in detail with respect to FIG. 4A and FIG. 4B.

Simultaneously with, or prior to, building a display list in local memory 109b, the second process of the present invention calculates and compares perspective ratios of each selected polygon 310. Specifically, the perspective ratios of each vertex pair for each triangle edge are calculated. For instance, the ratios: WA/WB, WB/WA, WB/WD, WD/WB, WD/WA, WA/WD are calculated for triangle 310 of FIG. 5A. If any of the above perspective ratios exceed the second perspective threshold, the edge between the selected vertices is split (thus forming new primitives, including triangles) by system 112 to prevent the creation of artifacts during the rendering process.

The second process of the present invention compares each perspective ratio to the given threshold and, in the event one or more edge pairs violate the threshold, subdivides the edge between the vertices corresponding to the perspective ratio and finds the mid-point of the edge. Splitting edges causes new primitives (e.g., triangles) to be formed and edges are split via their mid-point. If only one edge is split, two triangles result from one original triangle. If two edges need to be split in the original triangle, then three triangles result. If all three edges need to be split in the original triangle, then four triangles result. The midpoint is determined, in one preferred embodiment, by adding together the corresponding coordinates of the vertices of the edge using fixed point math and shifting the sum to affect a divide by two operation and a new vertex is assigned to the mid-point.

As described above, depending on the number of edges split, new triangles are created by connecting vertices and/or midpoints of the original triangle. The processing logic of the present invention then calculates new coordinates (x, y, z), new perspective terms (W), new texture coordinate values (u, v), and new color values (R, G, B), Red, Green, Blue, for any midpoints created. In one embodiment, a perspective term, WMid, is computed using a simple average of the perspective values at each of the vertices bounding the edge segment that has been divided. Accordingly, the perspective term, WMid, is assigned to the mid-point vertex and stored in memory 104 or memory 109b. It is appreciated that if any edge of the newly created triangles violates the threshold perspective ratio, that violating triangle is similarly split as described above, and so forth until all triangles of a particular display meet the perspective threshold.

Since divisions in accordance with the second process of the present invention are based on the edge rather than one or more vertices of the triangle, any original triangle that shares the selected edge, (and there might be several), will share the common mid-point vertex because the edge will be broken in the exact same manner thereby limiting artifacts even if you see the edge again with respect to another triangle much later in the display data stream. Since the process of the present invention consistently breaks up the edge each time it is encountered, the effect is to consistently rendering of the edge regardless of the coordinates of the vertices of the various triangles sharing the edge.

Figure 4A:
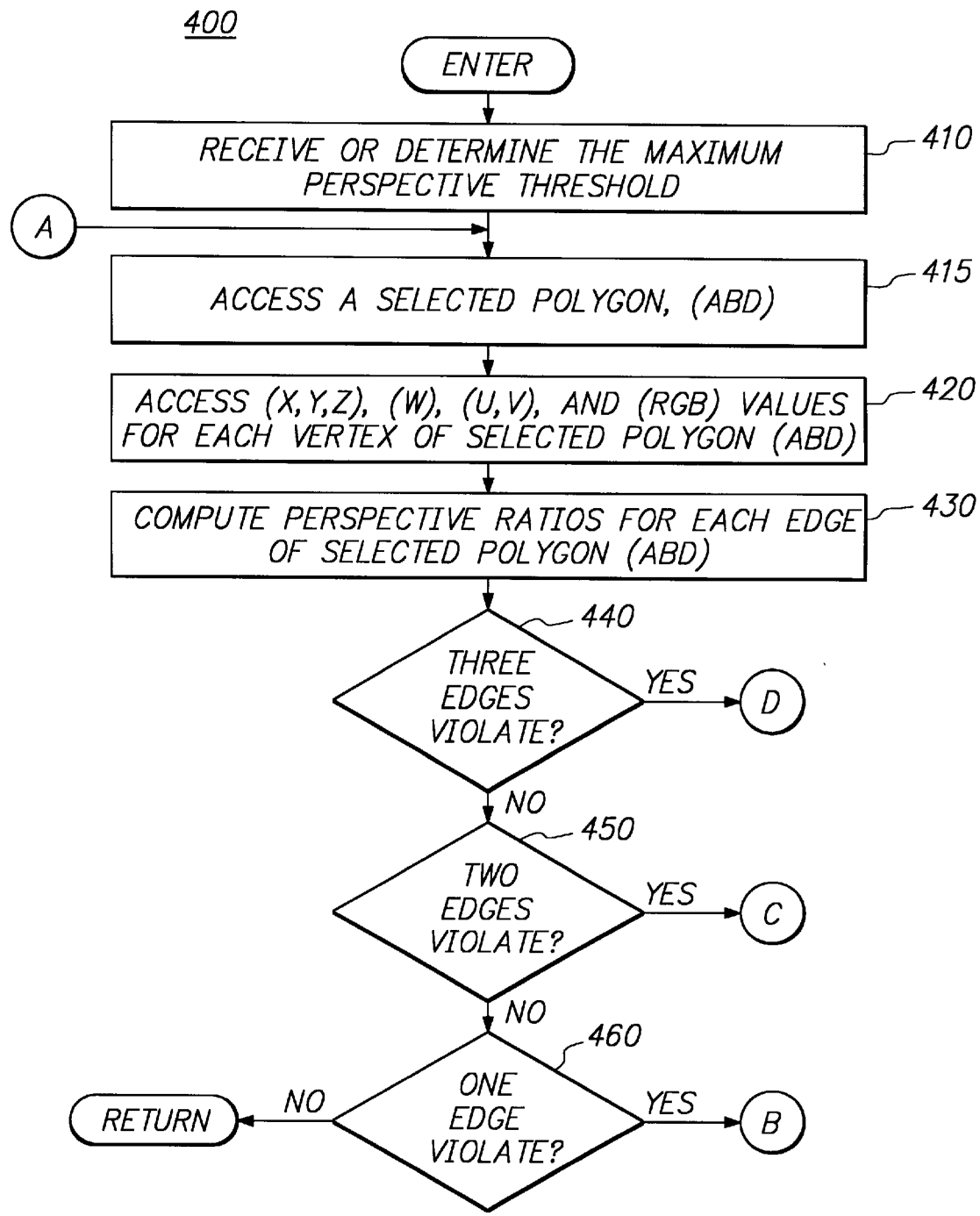
FIGS. 4A and 4B illustrate a flow diagram of processing logic in accordance with a second process of the present invention that is implemented on the computer controlled display system shown in FIG. 1 that divides a selected polygon when one or more perspective ratios exceed a selected threshold.
Figure 4B:
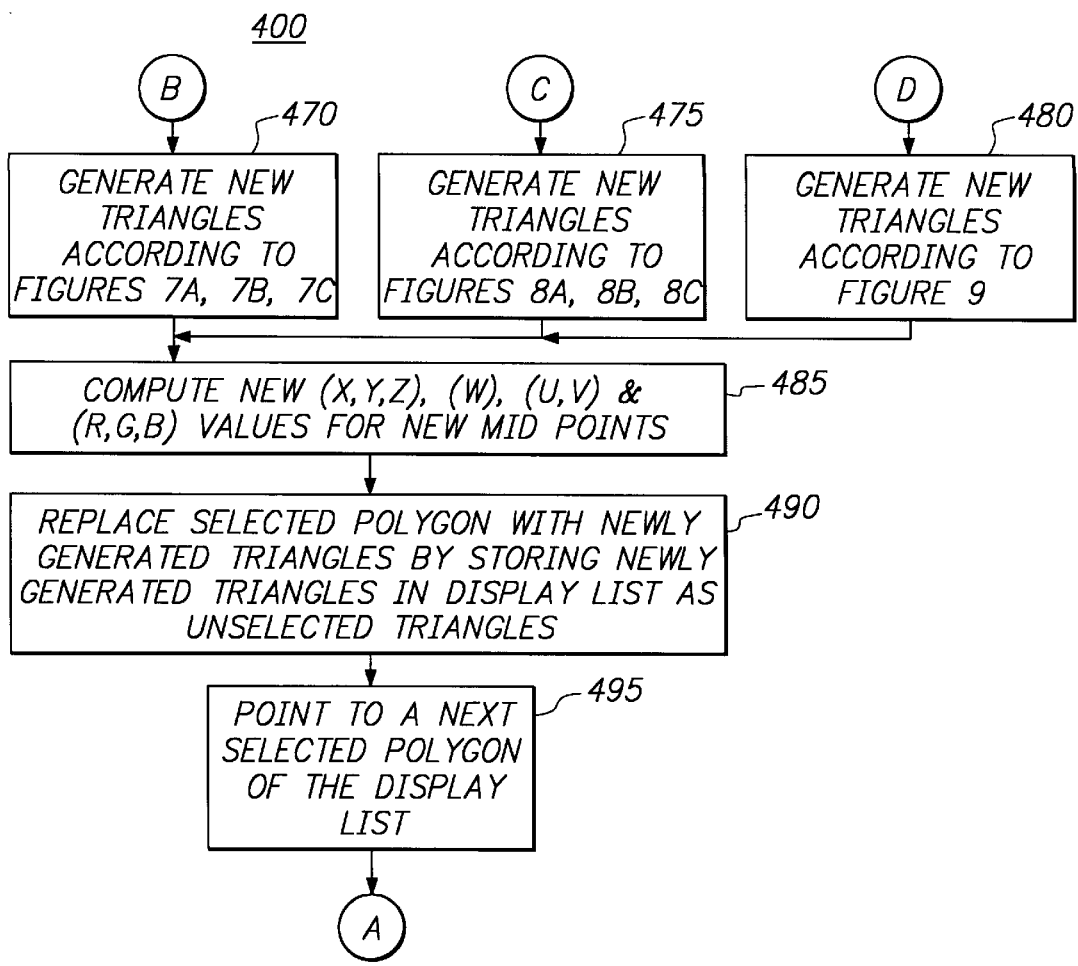

FIG. 4A and FIG. 4B illustrate a flow diagram of steps of the second process 400 of the present invention. It is appreciated that the processing logic 400 can be embedded in a pre-processor (e.g., hardcoded in memory 103 or another non-volatile memory unit of subsystem 109), performed by the host processor 101, or alternatively implemented as an application software module performed by graphics subsystem 109. In any event, process 400 is realized as software or instruction code stored in computer readable memory units of system 112. Processing logic 400 begins at an initialization step 410 (FIG. 4A) which includes accessing a maximum perspective ratio ("second perspective threshold"), which is determined based on the user originated S/Q value. As the S/Q value is increased, the second perspective threshold value is decreased to improve quality over performance and as the S/Q value is decreased, the second perspective threshold value is increased to improve performance over quality.

Figure 5A:
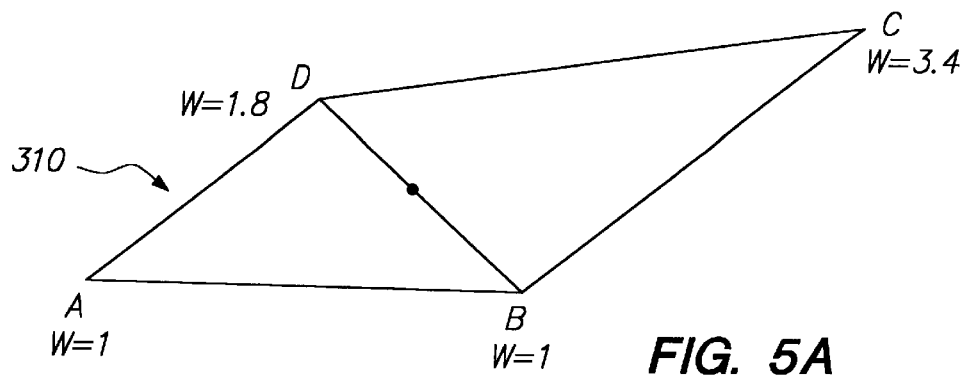
FIGS. 5A and FIG. 5B illustrate, respectively, a perspective view of a polygon having perspective ratios exceeding the preselected limit and a perspective view of the polygon after being split in accordance with the second process of the present invention.

At step 415, a polygon 310 (FIG. 5A) is selected (e.g., the selected polygon) from the display data list stored in local memory 109b of graphics subsystem 109. Polygon 310, as shown in FIG. 5A, includes vertices ABD. At step 420, the coordinates (x, y, z) of the vertices of the polygon of FIG. 5A are retrieved, the perspective terms WA, WB, and WD for vertices A, B, and D, respectively, are retrieved, and the RGB values and the texture coordinates (u, v) for each vertex of polygon 310 are retrieved.

Processing step 430 of FIG. 4A then calculates perspective ratios between each of the three edges of polygon ABD. Specifically, with respect to triangle ABD, perspective ratios are calculated for vertices pairs (edges): A and B; B and D; and A and D. The following perspective ratios are computed for each selected polygon at step 430:

Perspective Ratio1=WA/WB

Perspective Ratio2=WB/WA

Perspective Ratio3=WB/WD

Perspective Ratio4=WD/WB

Perspective Ratio5=WA/WD

Perspective Ratio6=WD/WA

At step 440 of FIG. 4A, it is determined whether or not the computed perspective ratios of at least three different edges violate (e.g., exceed) the second perspective threshold amount. If so, step 480 (FIG. 4B) is entered. If not, then at step 450, it is determined whether or not the computed perspective ratios of two different edges violate (e.g., exceed) the second perspective threshold amount, and that three different edges do not violate. If so, step 475 (FIG. 4B) is entered. If not, then at step 460, it is determined whether or not the computed perspective ratios of one edge violates (e.g., exceed) the second perspective threshold amount, and that two nor three edges violate. If so, step 470 (FIG. 4B) is entered. If not, then process 400 returns.

Figure 9:
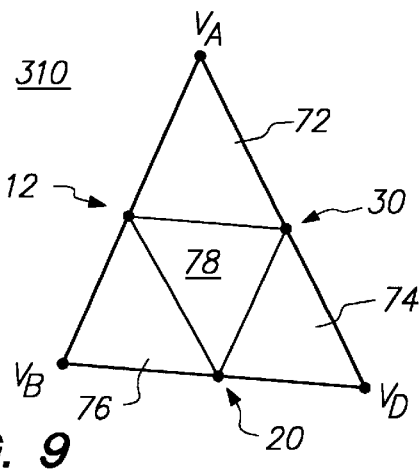
FIG. 9 illustrates one triangle split configuration when all of the three triangle edges exceed the perspective ratio in accordance with the second process of the present invention.

At step 440 of FIG. 4A, if three different edges of polygon 310 violate, then processing flows to step 480 of FIG. 4B where, as shown in FIG. 9, midpoints 12, 20 and 30 are determined and the selected polygon ABD 310 is divided with four new triangles 72, 74, 76, and 78 being generated. Triangle 72 is made up of vertex A, midpoint 12 and midpoint 30; triangle 74 is made up of vertex D, midpoint 20 and midpoint 30; triangle 76 is made up of vertex B, midpoint 20 and midpoint 12; and triangle 78 is made up of midpoints 12, 20 and 30. Then step 485 is entered.

In one particular embodiment of the present invention, the above perspective ratios can be computed by step 430 and then can be compared by step 440 (e.g., for triangle ABD) without using a divide operation according to the pseudo code format below:

vertex1.w=WA vertex2.w=WB vertex3.w=WD max_w_ratio=W_Ratio_Threshold w1_times_max=vertex1.w*max_w_ratio w2_times_max=vertex2.w*max_w_ratio w3_times_max=vertex3.w*max_w_ratio if ((vertex1.w<w2_times_max) AND (vertex1.w<w3_times_max) AND (vertex2.w<w1_times_max) AND (vertex2.w<w3_times_max) AND (vertex3.w<w1_times_max) AND (vertex3.w<w2_times_max))

then no perspective violation else perspective violation

Figure 8A:
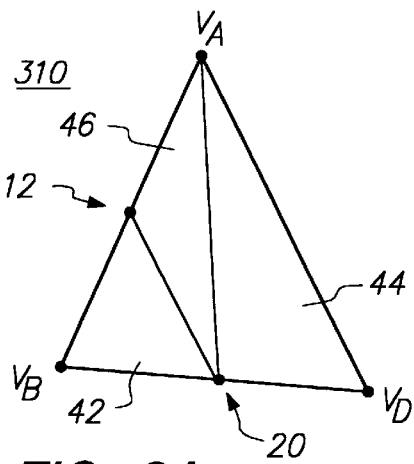
FIGS. 8A, 8B, and 8C illustrate three possible triangle split configurations when two of the three triangle edges exceed the perspective ratio in accordance with the second process of the present invention.
Figure 8B:
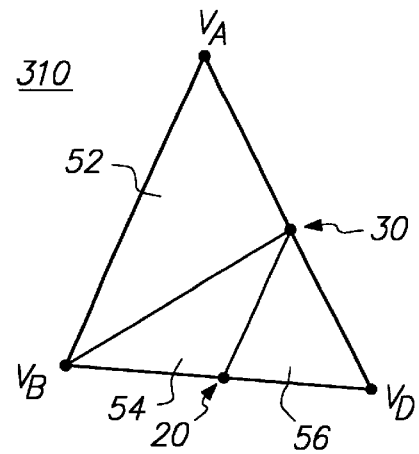
Figure 8C:
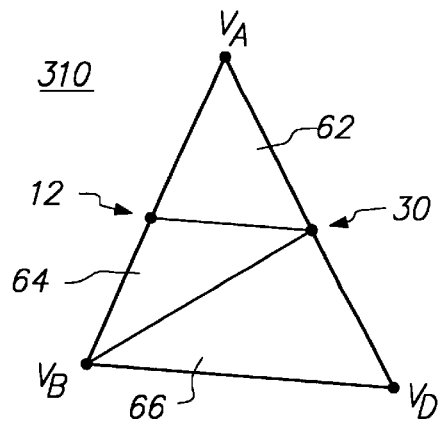

At step 450 of FIG. 4A, if two different edges of the selected polygon 310 violate, and three edges do not, then processing flows to step 475 of FIG. 4B where the present invention divides the selected polygon 310 into three triangles, depending on which two edges violate. As shown in FIG. 8A, if the edge between vertex A and vertex B violates and the edge between vertex B and vertex D violates, then at step 475, polygon 310 is divided into triangles 42, 44, and 46, with triangle 42 made up of vertex B, midpoint 12 and midpoint 20; triangle 44 made up of vertices A and D and midpoint 20; and triangle 46 made up of midpoints 12, 20 and vertex A. As shown in FIG. 8B, if the edge between vertex B and vertex D violates and the edge between vertex D and vertex A violates, then at step 475, polygon 310 is divided into triangles 52, 54, and 56, with triangle 52 made up of vertices A, B, and midpoint 30; triangle 54 made up of midpoints 20, 30 and vertex B; and triangle 56 made up of midpoints 20, 30 and vertex D. As shown in FIG. 8C, if the edge between vertex D and vertex A violates and the edge between vertex A and vertex B violates, then at step 475, polygon 310 is divided into triangles 62, 64, and 66, with triangle 62 made up of midpoints 12, 30 and vertex A; triangle 64 made up of midpoints 12, 30 and vertex B; and triangle 66 made up of vertices B, D and midpoint 30. Then step 485 is entered.

Figure 7A:
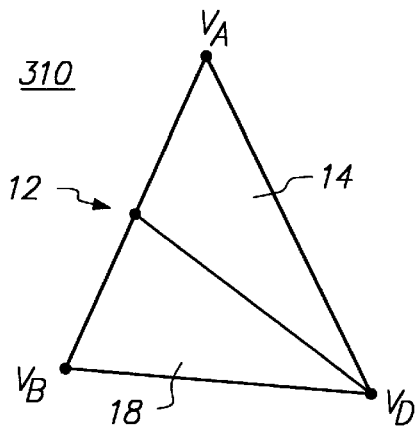
FIGS. 7A, 7B, and 7C illustrate three possible triangle split configurations when one of the three triangle edges exceeds the perspective ratio in accordance with the second process of the present invention.
Figure 7B:
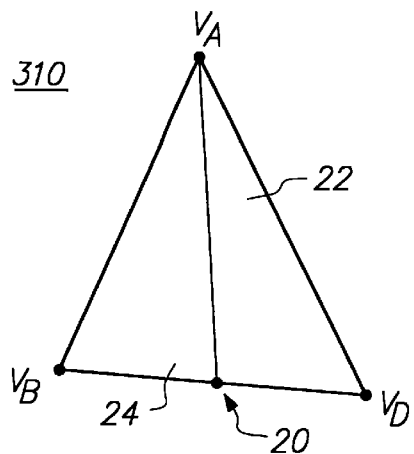
Figure 7C:
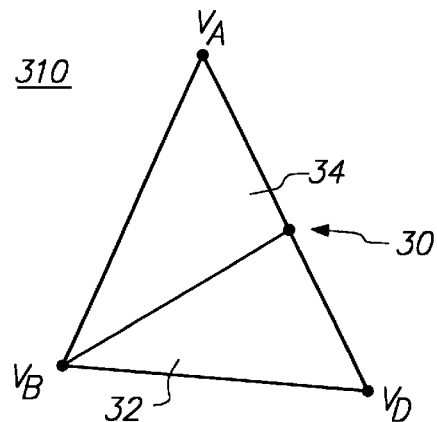

At step 450 of FIG. 4A, if one different edge violates and three edges and two edges do not, then processing flows to step 470 of FIG. 4B where the present invention divides the selected polygon 310 into two triangles, depending on which edge violates. As shown in FIG. 7A, if the edge between vertex A and vertex B violates, then at step 470, polygon 310 is divided into triangles 14 and 18, with triangle 14 made up of vertices A, D and midpoint 12; and triangle 18 made up of vertices B, D and midpoint 12. As shown in FIG. 7B, if the edge between vertex B and vertex D violates, then at step 470, polygon 310 is divided into triangles 22 and 24, with triangle 22 made up of vertices A, D and midpoint 20; and triangle 24 made up of vertices A, B and midpoint 20. As shown in FIG. 7C, if the edge between vertex A and vertex D violates, then at step 470, polygon 310 is divided into triangles 32 and 34, with triangle 32 made up of vertices B, D and midpoint 30; and triangle 34 made up of vertices A, B and midpoint 30. Then step 485 is entered.

At step 485 of FIG. 4B, the three dimensional coordinates (x, y, z), the colors (R, G, B), the texture coordinates (u, v) and the perspective term, (W, are computed for any midpoints (e.g., 12, 20, and 30) created by steps 470, 475, and 480. The manner in which these computations are performed is described in further detail with respect to FIG. 6A and FIG. 6B.

At step 490 of FIG. 4B, the selected polygon 310 is replaced by all new triangles generated by steps 470, 475 and 480. In particular, the selected polygon 310 (within the display list) is replaced by all newly generated triangles of steps 470, 475 and 480 with the newly generated triangles marked as "unselected" as stored in the display list. The new triangles are marked as unselected so that they can each be separately sent through process 400 and tested for perspective violations themselves. Process 400 completes when the selected triangle, or all subdivisions thereof, fail to have perspective violations.

Figure 5B:
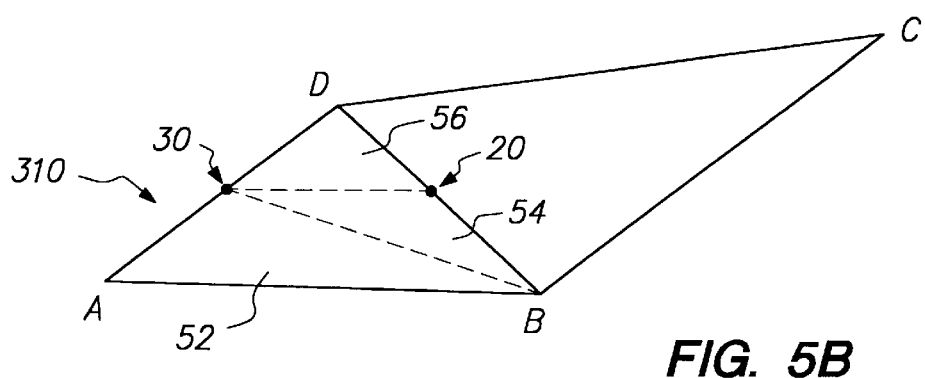

As an example of the operation of process 400, FIG. 5A illustrates perspective terms arbitrarily assigned for each vertex of polygon 310, with WA=1.0, WB=1.0 and WD=1.8. In ratio determining step 430, the ratio WD/WB is determined to be 1.8 (exceeding an exemplary second perspective threshold of 1.45) and this edge (BD) is determined to exceed the threshold. Further, the ratio WD/WA is also determined to be 1.8, so edge (DA) also exceeds the threshold. Accordingly, two edges violate, so step 450 responds in the affirmative. Polygon 310 is then split in accordance with FIG. 8B into triangles 52, 54, and 56 as shown in FIG. 5B. The newly generated triangles 52, 54, and 56 will be resubmitted to process 400 to determine whether the new perspective ratios exceed the second perspective threshold.

Figure 5C:
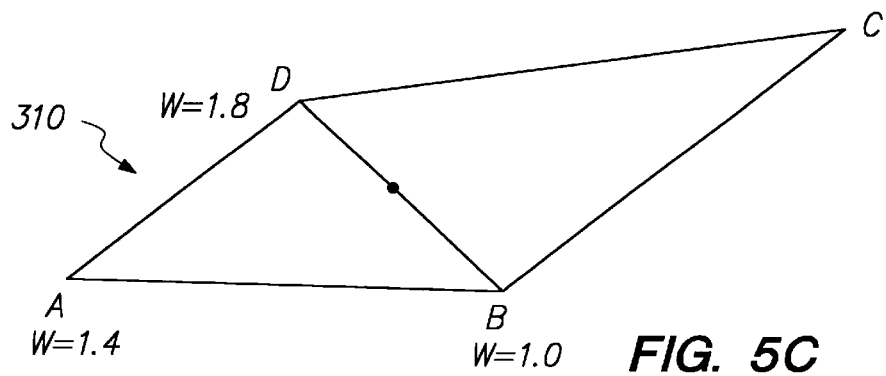
FIGS. 5C and FIG. 5D illustrate, respectively, a perspective view of a polygon having a perspective ratio exceeding the preselected limit and a perspective view of the polygon after being split in accordance with the second process of the present invention.
Figure 5D:
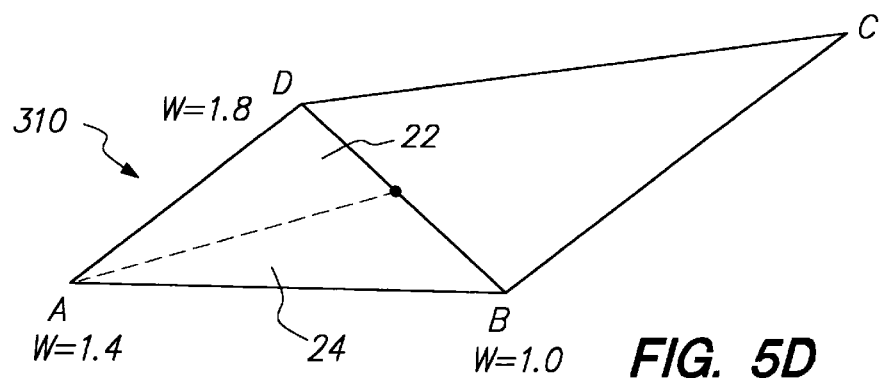

As another example, FIG. 5C illustrates that perspective terms for each vertex have been arbitrarily assigned to polygon 310 with WA=1.4, WB=1.0 and WD=1.8. In ratio determining step 430, the ratio WD/WB is determined to be 1.8 (exceeding threshold of 1.45 as set in the exemplary second perspective threshold) and this edge is determined to exceed the threshold. However, the other edges do not violate the perspective threshold. Accordingly, one edge violates, so step 460 responds in the affirmative. Polygon 310 is then split in accordance with FIG. 7B into triangles 22, and 24 as shown in FIG. 5D. The newly generated triangles 22 and 24 will be resubmitted to process 400 to determine whether the new perspective ratios exceed the second perspective threshold.

Once all perspective ratios of all edges of all polygons of the display list are less than the selected perspective threshold, the procedure of FIG. 4 is terminated and the graphics data may be rendered to the display screen 105 without noticeable artifacts. To avoid creating tearing or creation of artifacts when two triangles, such as triangle ABD and BCD, share a common co-linear edge (such as, for example, edge BD), the present invention consistently splits edges in the same location. It is an advantage of the present invention that inserted vertices will always be at the identical coordinate on common edges regardless of whether triangle ABD or BCD is processed for display and without regard to relative positioning of the triangles in the display stream. Accordingly, the object is rendered without missing pixels or gaps along common or co-linear edges.

For image rendition requiring high image quality, the second perspective threshold can be selected so that each triangle is divided into a higher number of triangles in order to achieve the desired image quality. For example, the second perspective threshold may be selected from the range of 1.2 to a maximum value where such maximum value is a function of graphics subsystem 109. Alternatively, if high image quality is not required or desired due to memory or speed constraints, the second perspective threshold may be selected from the range of 1.5 to about 3 or 5.

Figure 6A:
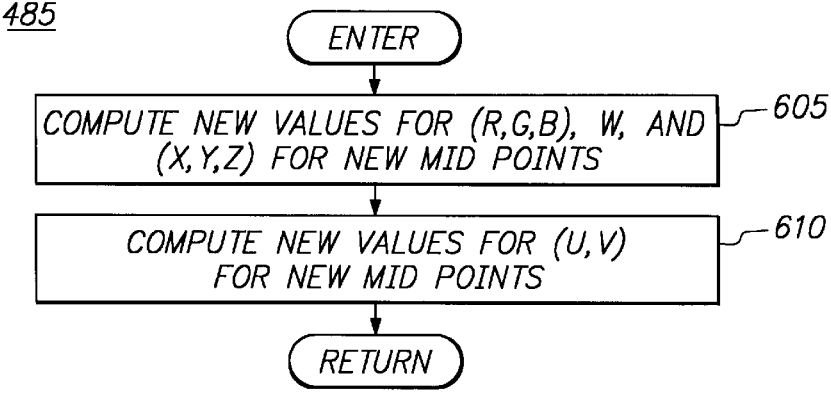
FIG. 6A and FIG. 6B illustrate a flow diagram of processing logic for determining new 3-D coordinates (x, y, z), perspective terms (W), texture coordinates (u, v), and color values (R, G, B) for midpoints determined in accordance with the second process of the present invention.

As discussed above, at step 485 of FIG. 4B, the three dimensional coordinates (x, y, z), the colors (R, G, B), the texture coordinates (u, v) and the perspective value, W, are computed for all midpoints 12, 20, and 30. FIGS. 6A and FIG. 6A illustrate a flow chart of the steps performed by process 485 used to determine these values in accordance with the present invention. At step 610 of FIG. 6A, the new values for (R, G, B), (x, y, z) and W are computed for each new midpoint generated by process 400. The following relationships are used assuming an edge comprising vertex A and vertex B is divided and assuming further vertex A has coordinates (xA, yA, zA) and vertex B has coordinates (xB, yB, zB). Further, vertex A has perspective term, WA, and colors (RA, GA and BA) and vertex B has perspective term, WB, and colors (RB, GB and BB). Step 600 is performed using the following relationships:

Wmidpoint=(WA+WB)/2
Rmidpoint=(RA+RB)/2
Gmidpoint=(GA+GB)/2
Bmidpoint=(BA+BB)/2
xmidpoint=(xA+xB)/2
ymidpoint=(yA+yB)/2
zmidpoint=(zA+zB)/2 where (xmidpoint, ymidpoint, zmidpoint) are the (x, y, z) coordinates of the new midpoint of the divided edge (AB), (Rmidpoint, Gmidpoint, Bmidpoint) are the (R, G, B) color values of the new midpoint, and Wmidpoint is the perspective term of the new midpoint of the divided edge.

Figure 6B:
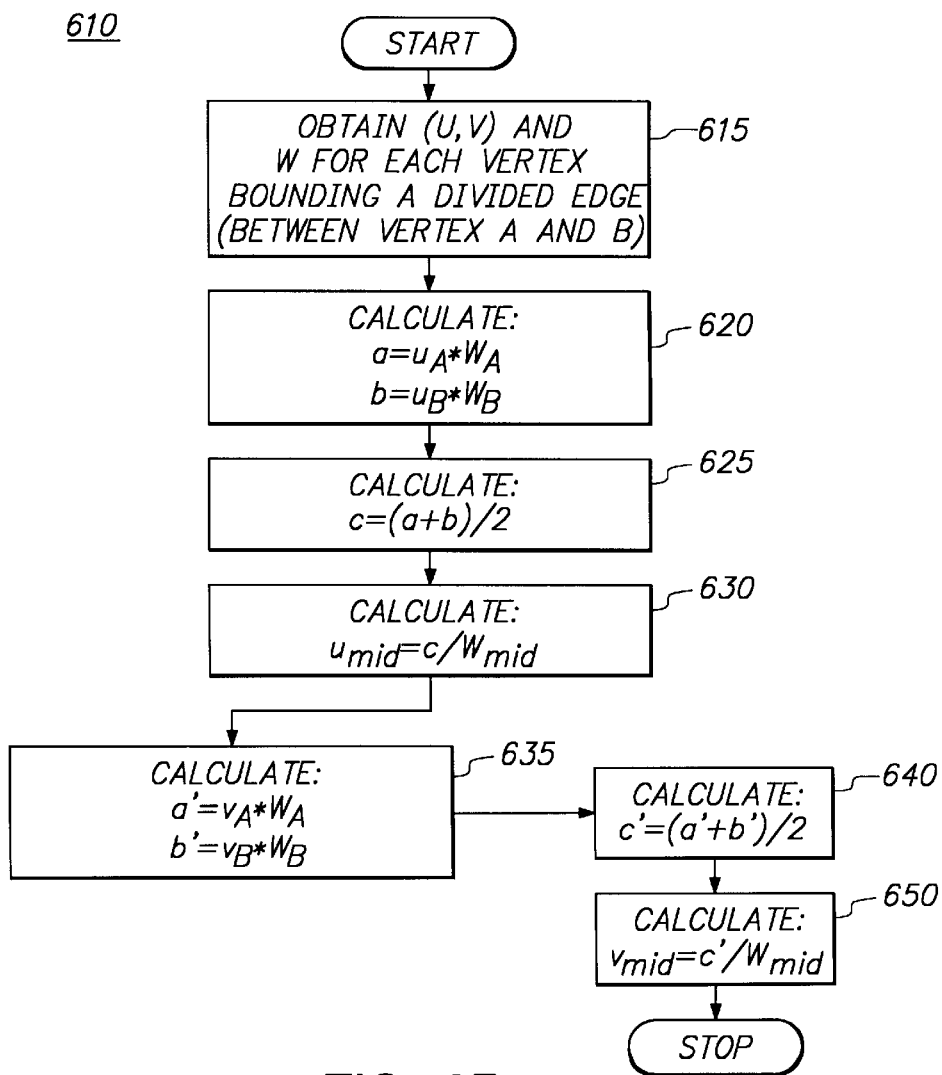

Values for texture coordinates (u, v) at the midpoint of the divided edge, that is (umid, vmid), are calculated by step 610 of FIG. 6A which is described in more detail in the processing logic shown in FIG. 6B. At processing step 615 the texture coordinates, (uA, vA) and (uB, vB), and perspective terms, WA and WB, for each vertex (e.g., vertex A and vertex B) bounding a divided edge are obtained. At process step 620, intermediate variables, a and b, are calculated according to the following relationships:

$a=uA*WA$ where uA denotes the u-axis texture coordinate at vertex A while WA denotes the perspective value at vertex A; and:

$b=uB*WB$ where uB denotes the u-axis texture coordinate at vertex B while WB denotes the perspective value at vertex B. Intermediate variable, c, is then calculated at process step 625 of FIG. 6B according to the relationship below:

$c=(a+b)/2$ and umid is then calculated at process step 630 according to:

$umid=c/Wmid$

As shown in processing steps 635–650, a value for vmid is calculated in accordance with the process logic in steps 620–630 by replacing u-axis texture coordinates, uA and uB, with the corresponding v-axis texture coordinates, vA and vB for vertices A and B. At the completion of step 650, the texture coordinates (umid, vmid) are computed. With the newly determined texture coordinates, texture data can be interpolated for pixels within each triangle based on the (u, v) coordinates assigned to the vertices of the triangle.

III. Polygon Split Based on Size

Figure 10:
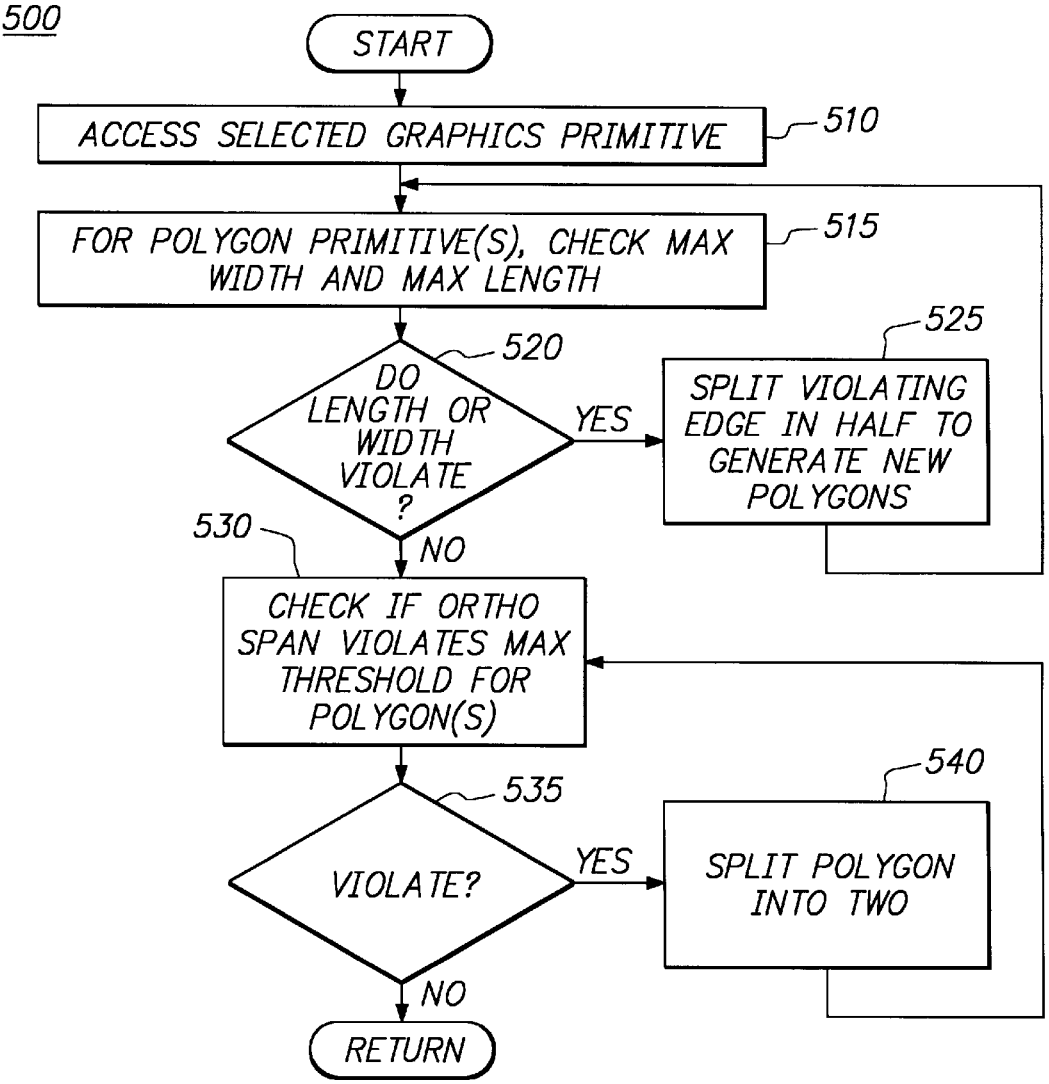
FIG. 10 is a flow diagram of steps of a process which divides a selected polygon based on a max length, max width determination and an ortho span measurement in accordance with a third process of the present invention.

FIG. 10 illustrates the third process 500 of the present invention which splits a selected polygon 310 based on its size. The size is determined with reference to determined threshold values which can be adjusted based on the S/Q value, referenced above. Process 500 recognizes that in certain contexts, large sized polygons, when rendered, can display viewable artifacts attributed to accumulated error that is particularly acute when used in conjunction with an interpolation driven texture mapping processes, such as the processed referenced above. Process 500 of the present invention determines when the selected polygon is too large in size, based on determined threshold values, and then splits the selected polygon into two new triangles of smaller size each. Divided triangles can be subdivided until all meet the size thresholds.

The S/Q value adjusts the size thresholds such that when the S/Q value increases, the size threshold values decrease to provide more quality over performance (e.g., more triangles are split) and when the S/Q value decreases, the size threshold values increase to provide performance over quality (e.g., less triangles are split).

Process 500 is implemented as program code stored in computer readable memory units of system 112. Process 500 starts at step 510 where the selected polygon 310 is accessed. At step 515, the maximum width (W 10, FIG. 2) of the selected polygon 310 is compared against a second predetermined width threshold value. Also, the maximum height (H 12, FIG. 2) of the selected polygon 310 are compared against a second predetermined height threshold value. At step 520, if either the maximum width or the maximum length of the selected polygon violate, then at step 525, the selected polygon 310 is divided into new polygons at step 525. If only one dimension (e.g., height or width) violates, then at step 525, the selected polygon 310 is split into two new triangles with the edge spanning the violating dimension being split (e.g., in half). If both dimensions violate, then at step 525, the selected polygon 310 is split into three new triangles with each edge spanning a violating dimension being split (e.g., in half). The new triangles are each then run through steps 515 and 520 for a size check to determine if further subdivisions are required, and so on.

At step 520 of FIG. 10, if the max length 12 and the max width 10 do not violate, then step 530 is entered. At step 530, the present invention checks if the ortho span (e.g., 0 18, FIG. 2) of the selected polygon 310 (or of any of the subdivided triangles) violates a predetermined ortho size threshold. Step 530 is separately performed for each triangle generated by step 525. At step 535, if a violation exists, then at step 540, the selected polygon 310 (or any subdivided triangle) is split into two new triangles such that its ortho span is reduced in size, e.g., an edge of the polygon 310 that is not the major slope 16 (FIG. 2) is split (e.g., in half). Each new triangle is then sent through steps 530 and 535 to determine if further subdivisions are required. At the completion of process 500, the selected polygon 310 will satisfy the height, width and ortho size constraints, or it will have been subdivided into a number of triangles (or subdivided triangles) which each will satisfy the height, width and ortho size constraints.

The second width threshold, the second height threshold and the ortho size threshold are each adjusted based on the currently selected S/Q value in the following manner. As the S/Q value increases, more quality is desired so these threshold values decrease in order increase the number of triangles split. As the S/Q value decreases, more performance is desired so these threshold values increase in order to split less triangles and allow larger triangles to be rendered. More specifically, in one implementation, the ortho size threshold is set to approximately 180 pixels and if the S/Q value is less than 0.5 of its range, then no adjustment is made to the ortho size threshold. When the S/Q value increases past 0.5 of its range, then the ortho size threshold is decreased proportionately for better image quality over performance.

IV. Selection of Fixed Point or Floating Point Calculations

Figure 11:
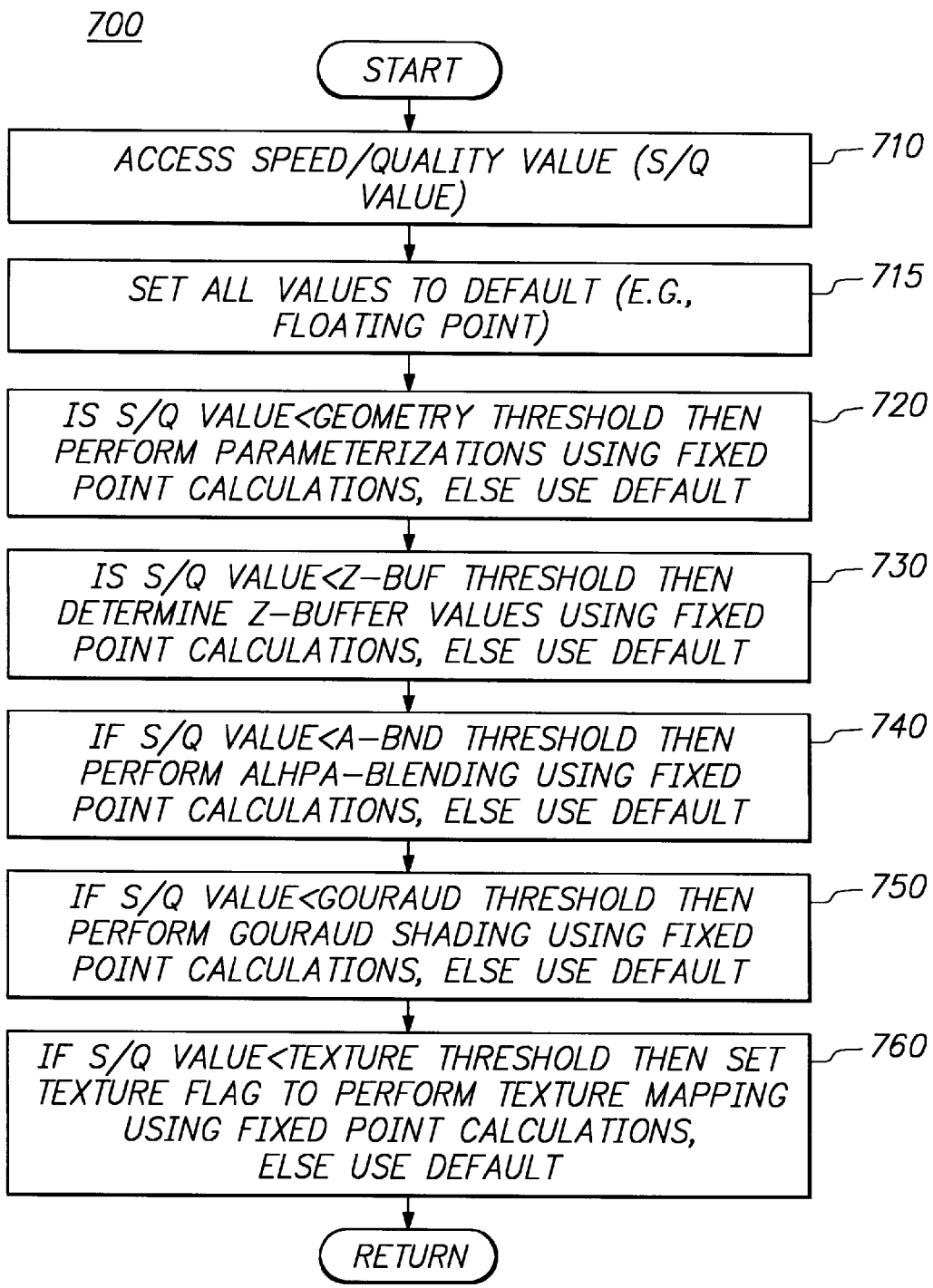
FIG. 11 is a flow diagram of steps of a process which selects either fixed point or floating point computations with respect to a selected graphics primitive in accordance with a fourth process of the present invention.

FIG. 11 illustrates a fourth process 700 of the present invention that selects either fixed point or floating point calculations for graphics rendering processes based on the S/Q value, referenced above. In many applications, floating point computations are performed with higher precision over fixed point computations, but take more time to perform. Therefore, if the S/Q value is equal to or larger than a predetermined setting (e.g., half its maximum range), floating point computations can be selected, otherwise the faster fixed point computations can be are used. In those applications/systems in which floating point is actually faster over fixed point, the above is of course reversed.

The fourth process 700 of the present invention provides separate threshold values for controlling whether fixed point or floating point computations are performed for: geometry processes; Z-buffer computations; alpha blending computations; gouraud shading; and texture mapping processes. Process 700 is implemented as program code stored in computer readable memory units of system 112. Process 700 starts at step 710 where the current setting of the S/Q value is obtained. At step 715, all processes are set initially to a default computation mode (e.g., floating point). Although floating point is the default at step 715, fixed point could alternatively be the default.

At step 720 of FIG. 11, if the S/Q value is less than a predetermined geometry threshold, then all parameterizations that effect the geometry of the graphics primitive are performed using fixed point calculations to emphasize performance over quality. Otherwise, the default (floating point) is used for geometry computations to emphasize quality over performance. At step 730, if the S/Q value is less than a predetermined Z-buffer threshold, then Z-buffering is performed with respect to the selected primitive 310 using fixed point computations to emphasize performance over quality. Otherwise, the default (floating point) is used for Z-buffer computations to emphasize quality over performance. At step 740, if the S/Q value is less than a predetermined alpha-blend threshold, then alpha blending is performed with respect to the selected primitive 310 using fixed point computations to emphasize performance over quality. Otherwise, the default (floating point) is used for alpha-blending computations to emphasize quality over performance. At step 750, if the S/Q value is less than a predetermined gouraud threshold, then gouraud shading is performed with respect to the selected primitive 310 using fixed point computations to emphasize performance over quality. Otherwise, the default (floating point) is used for gouraud shading to emphasize quality over performance.

At step 760 of FIG. 11, if the S/Q value is less than a predetermined texture threshold, then texture mapping operations are performed with respect to the selected primitive 310 using fixed point computations to emphasize performance over quality. Otherwise, the default (floating point) is used for texture mapping to emphasize quality over performance. Process 700 then returns. It is appreciated that each of the above thresholds of process 700 is independently tunable within the present invention. In one embodiment, the break point for computing parameterizations (step 720) is ½ the maximum S/Q range while for each other threshold the break point is ¾ (or higher) of the maximum S/Q range. In one implementation of the fourth process 700, each threshold, as default, is set to ½ of the maximum range of the S/Q value. In applications/systems wherein floating point computations take longer to determine than fixed point, the above designations regarding floating point and fixed point are reversed.

IV. Exemplary Use of S/Q Tunable Procedures

Figure 12:
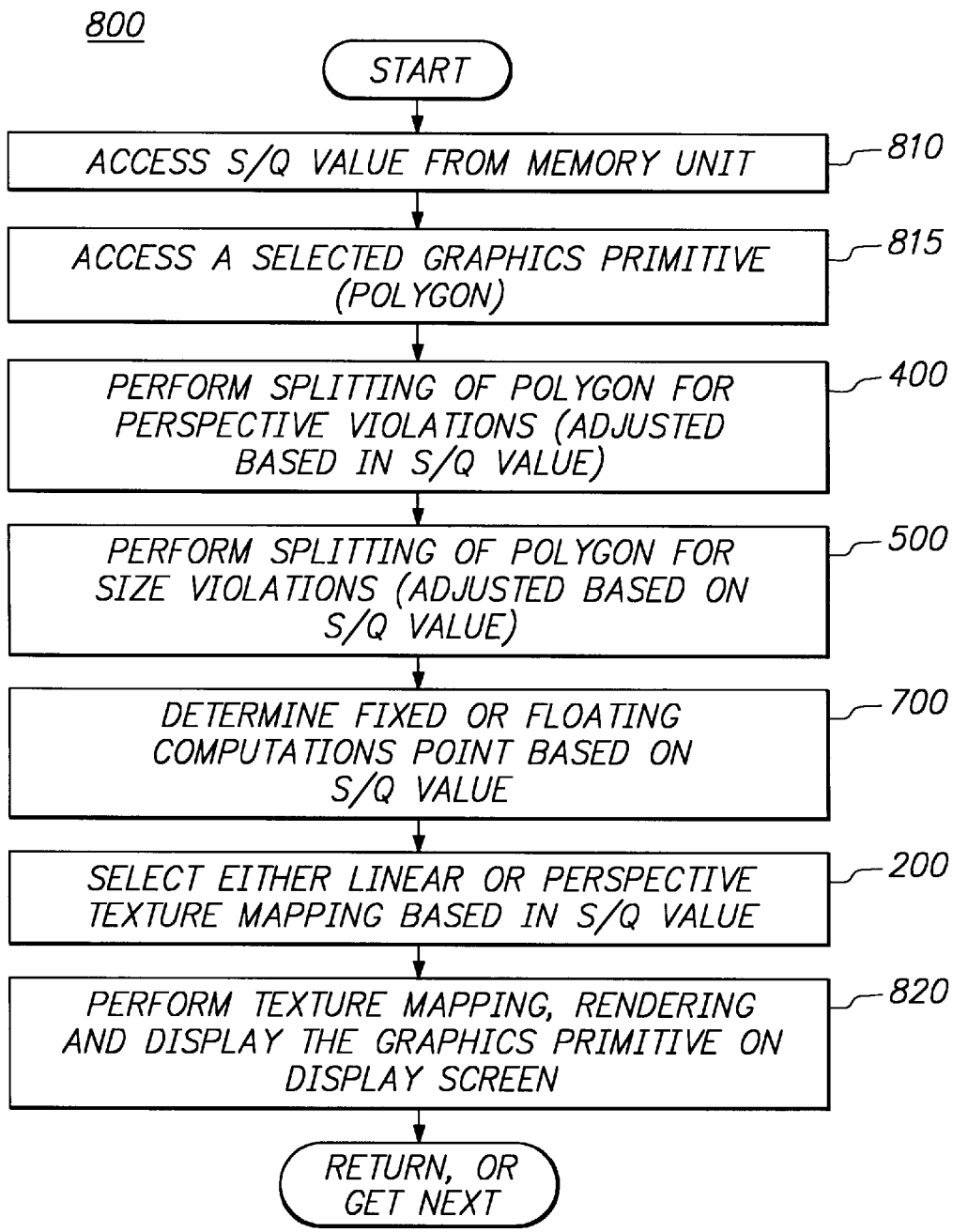
FIG. 12 is a flow diagram of steps of a high level process for rendering a selected graphics primitive that incorporates the first, second, third, and fourth processes of the present invention.

FIG. 12 is a flow diagram of steps of an exemplary high level process 800 for rendering a selected graphics primitive that incorporates the first, second, third, and fourth processes of the present invention. Process 800 is implemented as program code stored in computer readable memory units of system 112. At step 810, the current setting of the S/Q gauge is obtained. Step 810 can be performed using a predefined library function call which accesses a predetermined location of computer memory 102. In one implementation, the S/Q value is set within a range from 0 to 255 where 0 represents maximum performance over quality and 255 represents maximum quality over performance. Settings in between these values represent proportional weightings toward performance or quality (or vice-versa, as the case may be). At step 815, the present invention accesses a selected polygon 310.

At step 400 of FIG. 12, the present invention performs splitting operations on the selected polygon 310 based on the perspective of the polygon 310, as discussed above. The second perspective threshold that determines when the selected polygon 310 should be split in process 400 is adjusted based on the obtained S/Q value. If the selected polygon 310 is split by process 400, then process 400 supplies each resultant subdivided polygon to processes 500 individually, which each subdivided polygon is referred to as "selected polygon 310" with respect to process 500.

At step 500, the present invention performs splitting operations on each selected polygon 310 received from process 400 based on size violations, as discussed above.

The second width, second height and ortho size thresholds that determine when the selected polygon 310 should be split in process 500 are each adjusted based on the S/Q value. If the selected polygon 310 is split by process 500, then process 500 supplies each resultant subdivided polygon to processes 700 individually, which each subdivided polygon is referred to as "selected polygon 310" with respect to process 700.

Process 700 of FIG. 12 then determines whether or not certain computations are to be performed in floating point or fixed point for each selected polygon 310 supplied from step 500 based on the S/Q value. At step 200, the present invention determines whether linear or perspective texture mapping operations should be done on each received selected polygon 310 based on size and perspective. The first width, first height and first perspective thresholds that determine whether the selected polygon 310 should be linearly or perspectively texture mapped are each adjusted based on the S/Q value. Lastly, at step 820, the present invention performs the texture mapping process as selected by step 200, any other computations required to physically render the graphics primitive on display screen 105 for observation. It is appreciated that process 800 is performed for each graphics primitive in the display list of memory 109b.

Conclusion

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. In a computer controlled graphics display system, a method of displaying a polygon data structure on a display screen, said method comprising the steps of:
   (a) accessing a user originated speed/quality setting;
   (b) determining whether to render said polygon using either linear or perspective texture mapping procedures based on (1) a perspective orientation of said polygon and based on (2) the size of said polygon, said step (b) adjusted based on said speed/quality setting;
   (c) splitting said polygon into at least two triangles based on said perspective orientation of said polygon, said step (c) adjusted based on said speed/quality setting;
   (d) splitting said polygon into at least two triangles based on said size of said polygon, said step (d) adjusted based on said speed/quality setting;
   (e) performing a plurality of graphics processes using fixed point or floating point computations based on a plurality of thresholds and said speed/quality setting, each of said plurality of thresholds independently adjusted by said speed/quality setting; and
   (f) rendering said polygon, or subdivisions thereof, on a display screen, said step (f) comprising the step of texture mapping said polygon, or subdivisions thereof, using a linear interpolation driven texture mapping procedure.

2. A method as described in claim 1 wherein said step (b) comprises the steps of:
   (b1) determining to render said polygon using linear texture mapping procedures provided a maximum height of said polygon is less than a first height threshold and a maximum width of said polygon is less than a first width threshold; and
   (b2) determining to render said polygon using linear texture mapping procedures provided said perspective orientation of said polygon is less than a first perspective threshold; and
   (b3) determining to render said polygon using perspective texture mapping procedures provided said polygon is not otherwise determined to be rendered using linear texture mapping procedures by step (b1) or by step (b2) above.

3. A method as described in claim 1 wherein step (c) comprises the steps of:
   (c1) determining perspective ratios for each pair of adjacent vertices of at least three vertices of said polygon; and
   (c2) subdividing said polygon to generate a plurality of new polygons provided any of said perspective ratios exceeds a second perspective threshold.

4. A method as described in claim 1 wherein said step (d) comprises the steps of:
   (d1) splitting said polygon along its height, into two triangles, provided a maximum height of said polygon exceeds a second height threshold;
   (d2) splitting said polygon along its width, into two triangles, provided a maximum width of said polygon exceeds a second width threshold; and
   (d3) splitting said polygon into two triangles provided an ortho span of said polygon exceeds an ortho size threshold.

5. A method as described in claim 1 wherein said step (e) comprises the steps of:
   performing fixed point parameterizations effecting the geometry of said polygon provided said speed/quality setting is less than a geometry threshold, otherwise performing floating point parameterizations;
   performing fixed point Z-buffer computations provided said speed/quality setting is less than a Z-buffer threshold, otherwise performing floating point Z-buffer computations;
   performing fixed point alpha blending computations provided said speed/quality setting is less than an alpha blending threshold, otherwise performing floating point alpha blending computations; and
   performing fixed point gouraud shading computations provided said speed/quality setting is less than a gouraud shading threshold, otherwise performing floating point gouraud shading computations.

6. In a computer controlled graphics display system, a method of displaying a polygon data structure on a display screen, said method comprising the steps of:
   (a) accessing a user originated speed/quality setting;
   (b) determining whether to render said polygon using either linear or perspective texture mapping procedures based on (1) a perspective orientation of said polygon and a first perspective threshold and based on (2) a size of said polygon and a first size threshold, said step (b) adjusted based on said speed/quality setting;
   (c) splitting said polygon into at least two triangles based on said perspective orientation of said polygon and a second perspective threshold, said step (c) adjusted based on said speed/quality setting;
   (d) splitting said polygon into at least two triangles based on said size of said polygon and a second size threshold, said step (d) adjusted based on said speed/quality setting;
   (e) performing a plurality of graphics processes using fixed point or floating point computations based on a plurality of thresholds and said speed/quality setting, each of said plurality of thresholds independently adjusted by said speed/quality setting; and (f) rendering said polygon, or subdivisions thereof, on a display screen, said step (f) comprising the step of texture mapping said polygon, or subdivisions thereof, using a texture mapping procedure as determined by said step (b).

7. A method as described in claim 6 wherein said first size threshold comprises a first height threshold and a first width threshold and wherein said step (b) comprises the steps of:

(b1) determining to render said polygon using linear texture mapping procedures provided a maximum height of said polygon is less than said first height threshold and a maximum width of said polygon is less than said first width threshold; and (b2) determining to render said polygon using linear texture mapping procedures provided said perspective orientation of said polygon is less than said first perspective threshold; and (b3) determining to render said polygon using perspective texture mapping procedures provided said polygon is not otherwise determined to be rendered using linear texture mapping procedures by step (b1) or by step (b2) above.

8. A method as described in claim 6 wherein step (c) comprises the steps of:

(c1) determining perspective ratios for each pair of adjacent vertices of at least three vertices of said polygon; and (c2) subdividing said polygon to generate a plurality of new polygons provided any of said perspective ratios exceeds said second perspective threshold.

9. A method as described in claim 8 wherein said step (c2) comprises the steps of:

dividing said polygon into four new triangles provided three edges of said polygon have perspective ratios exceeding said second perspective threshold;

dividing said polygon into three new triangles provided only two edges of said polygon have perspective ratios exceeding said second perspective threshold; and dividing said polygon into two new triangles provided only one edge of said polygon has a perspective ratio exceeding said second perspective threshold.

10. A method as described in claim 6 wherein said second size threshold comprises a second height threshold, a second width threshold and an ortho size threshold and wherein said step (d) comprises the steps of:

(d1) splitting said polygon along its height, into two triangles, provided a maximum height of said polygon exceeds said second height threshold;

(d2) splitting said polygon along its width, into two triangles, provided a maximum width of said polygon exceeds said second width threshold; and (d3) splitting said polygon into two triangles provided an ortho span of said polygon exceeds said ortho size threshold.

11. A method as described in claim 6 wherein said step (e) comprises the steps of:

performing fixed point parameterizations effecting the geometry of said polygon provided said speed/quality setting is less than a geometry threshold, otherwise performing floating point parameterizations;

performing fixed point Z-buffer computations provided said speed/quality setting is less than a Z-buffer threshold, otherwise performing floating point Z-buffer computations;

performing fixed point alpha blending computations provided said speed/quality setting is less than an alpha blending threshold, otherwise performing floating point alpha blending computations; and performing fixed point gouraud shading computations provided said speed/quality setting is less than a gouraud shading threshold, otherwise performing floating point gouraud shading computations.

12. A method as described in claim 6 wherein said step (f) comprises the step of performing fixed point texture mapping computations provided said speed/quality setting is less than a texture map threshold, otherwise performing floating point texture mapping computations.

13. A method as described in claim 6 further comprising the steps of:

reducing said first perspective threshold and said first size threshold as said speed/quality setting increases and increasing said first perspective threshold and said first size threshold as said speed/quality setting decreases;

reducing said second perspective threshold as said speed/quality setting increases and increasing said second perspective threshold as said speed/quality setting decreases; and reducing said second size threshold as said speed/quality setting increases and increasing said second size threshold as said speed/quality setting decreases.

14. In a computer controlled graphics display system having a processor coupled to bus, a graphics subsystem coupled to said bus, a display coupled to said bus, and a computer readable memory unit coupled to said bus and storing instructions therein that when executed causing said system to implement a method for displaying a polygon on said display, said method comprising the steps of:

(a) accessing a user originated speed/quality setting;

(b) determining whether to render said polygon using either linear or perspective texture mapping procedures based on (1) a perspective orientation of said polygon and a first perspective threshold and based on (2) a size of said polygon and a first size threshold, said step (b) adjusted based on said speed/quality setting;

(c) splitting said polygon into at least two triangles based on said perspective orientation of said polygon and a second perspective threshold, said step (c) adjusted based on said speed/quality setting;

(d) splitting said polygon into at least two triangles based on said size of said polygon and a second size threshold, said step (d) adjusted based on said speed/quality setting;

(e) performing a plurality of graphics processes using fixed point or floating point computations based on a plurality of thresholds and said speed/quality setting, each of said plurality of thresholds independently adjusted by said speed/quality setting; and (f) rendering said polygon, or subdivisions thereof, on a display screen, said step (f) comprising the step of texture mapping said polygon, or subdivisions thereof, using a texture mapping procedure as determined by said step (b).

15. A computer readable memory unit as described in claim 14 wherein said first size threshold comprises a first height threshold and a first width threshold and wherein said step (b) comprises the steps of:

(b1) determining to render said polygon using linear texture mapping procedures provided a maximum height of said polygon is less than said first height threshold and a maximum width of said polygon is less than said first width threshold; and (b2) determining to render said polygon using linear texture mapping procedures provided said perspective orientation of said polygon is less than said first perspective threshold; and (b3) determining to render said polygon using perspective texture mapping procedures provided said polygon is not otherwise determined to be rendered using linear texture mapping procedures by step (b1) or by step (b2) above.

16. A computer readable memory unit as described in claim 14 wherein step (c) comprises the steps of:

(c1) determining perspective ratios for each pair of adjacent vertices of at least three vertices of said polygon; and (c2) subdividing said polygon to generate a plurality of new polygons provided any of said perspective ratios exceeds said second perspective threshold.

17. A computer readable memory unit as described in claim 16 wherein said step (c2) comprises the steps of:

dividing said polygon into four new triangles provided three edges of said polygon have perspective ratios exceeding said second perspective threshold;

dividing said polygon into three new triangles provided only two edges of said polygon have perspective ratios exceeding said second perspective threshold; and dividing said polygon into two new triangles provided only one edge of said polygon has a perspective ratio exceeding said second perspective threshold.

18. A computer readable memory unit as described in claim 14 wherein said second size threshold comprises a second height threshold, a second width threshold and an ortho size threshold and wherein said step (d) comprises the steps of:

(d1) splitting said polygon along its height, into two triangles, provided a maximum height of said polygon exceeds said second height threshold;

(d2) splitting said polygon along its width, into two triangles, provided a maximum width of said polygon exceeds said second width threshold; and (d3) splitting said polygon into two triangles provided an ortho span of said polygon exceeds said ortho size threshold.

19. A computer readable memory unit as described in claim 14 wherein said step (e) comprises the steps of:

performing fixed point parameterizations effecting the geometry of said polygon provided said speed/quality setting is less than a geometry threshold, otherwise performing floating point parameterizations;

performing fixed point Z-buffer computations provided said speed/quality setting is less than a Z-buffer threshold, otherwise performing floating point Z-buffer computations;

performing fixed point alpha blending computations provided said speed/quality setting is less than an alpha blending threshold, otherwise performing floating point alpha blending computations; and performing fixed point gouraud shading computations provided said speed/quality setting is less than a gouraud shading threshold, otherwise performing floating point gouraud shading computations.

20. A computer readable memory unit as described in claim 14 wherein said step (f) comprises the step of performing fixed point texture mapping computations provided said speed/quality setting is less than a texture map threshold, otherwise performing floating point texture mapping computations.

21. A computer readable memory unit as described in claim 14 wherein said method further comprising the steps of:

reducing said first perspective threshold and said first size threshold as said speed/quality setting increases and increasing said first perspective threshold and said first size threshold as said speed/quality setting decreases;

reducing said second perspective threshold as said speed/quality setting increases and increasing said second perspective threshold as said speed/quality setting decreases; and reducing said second size threshold as said speed/quality setting increases and increasing said second size threshold as said speed/quality setting decreases.

* * * * *